United States Patent [19]

Singer

[11] 3,873,279

[45] Mar. 25, 1975

[54] METHOD FOR THE CONTROL OF MICRO-ORGANISMS

[75] Inventor: Michael Singer, Manchester, England

[73] Assignee: Imperial Chemical Industries Limited, London, England

[22] Filed: July 31, 1973

[21] Appl. No.: 384,393

[30] Foreign Application Priority Data

Aug. 11, 1972 United Kingdom............. 37548/72

[52] U.S. Cl.................................. 44/76, 424/185
[51] Int. Cl............................................... C10l 1/30
[58] Field of Search.................. 44/76, 77; 424/185

[56] References Cited
UNITED STATES PATENTS

| | | | |
|---|---|---|---|
| 2,104,021 | 1/1938 | Callis...................................... | 44/56 |
| 2,128,685 | 8/1938 | Yates...................................... | 44/56 |
| 2,975,042 | 3/1961 | Summers, Jr. .......................... | 44/56 |
| 3,564,091 | 2/1971 | De Gray et al. ........................ | 44/76 |

*Primary Examiner*—Daniel E. Wyman
*Assistant Examiner*—Y. H. Smith
*Attorney, Agent, or Firm*—Cushman, Darby & Cushman

[57] ABSTRACT

The use of 1-hydroxy-3H-1,2-benzoxaborole as a biocide, particularly for controlling and preventing the growth of micro-organisms in aircraft fuel.

7 Claims, No Drawings

METHOD FOR THE CONTROL OF MICRO-ORGANISMS

This invention relates to a method for the control of micro-organisms by the use as a biocide of an organic boron compound.

According to the present invention there is provided a method for protecting a medium against infection by micro-organisms and for controlling and eradicating the growth of micro-organisms in a medium infected thereby, which comprises treating the medium with an effective amount of 1-hydroxy-3H-1,2-benzoxaborole.

The above-mentioned compound has the structure:

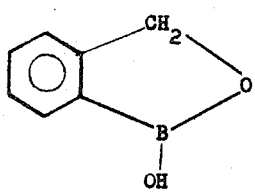

and its preparation is described in the Journal of the American Chemical Society, Volume 80, page 835 (1958).

The compound is effective in preventing media from becoming infected by micro-organisms, and where infection has already occurred, in controlling the growth of the micro-organisms and freeing the media from infection; by 'an effective amount' is meant an amount sufficient to achieve these results.

Applications of the compound include its use as an anti-microbial agent in the preservation of hides and sheepskins, control of microbial growth in oils and oil emulsions, control of growth of fungi on leather, paint and wood, control of the growth of fresh water and marine algae and the control of slime-forming organisms in industrial process waters such as in the water systems of paper mills.

However, the compound finds particular application in the control of microbiological contamination of hydrocarbons and particularly aircraft fuel. The contamination of aircraft fuel by micro-organisms became a significant problem when military and commercial jet aircraft with integral fuel tanks began to operate in tropical areas. It is believed that *Cladosporium resinae* and *Pseudomonas sp*, the organisms most often encounted in wing tanks, are responsible for filter blockage and corrosion damage to the structural metal. Aircraft fuel always contains a certain amount of water, and micro-organisms flourish at the fuel-water interface. This problem occurs in storage tanks as well as in the aircraft fuel tanks themselves. Previously, in order to suppress the growth of micro-organisms certain compounds have been added to the aircraft fuel. One such compound is ethylene glycol monomethyl ether (EGME), added to the fuel to provide a concentration of 0.15 to 0.20% by weight. This additive is moderately effective on its own, but in some instances it has been supplemented by addition of certain organic boron compounds or mixtures of compounds, preferably as intermittent or shock doses. 1-Hydroxy-3H-1,2-benzoxaborole has been found to be a very effective agent for controlling the growth of micro-organisms in aircraft fuel. It will normally be used for shock dosing of fuel already containing EGME as described above, but its use is not limited to this method of treatment. The compound can be employed as the sole biocidal agent.

1-Hydroxy-3H-1,2-benzoxaborole may be added to aircraft fuel to provide a concentration from 25 to 1,000 parts per million (ppm) by weight. In general, however, a concentration of approximately 100 ppm is found to be effective.

The invention is illustrated but not limited by the following Examples.

EXAMPLE 1

The following test method was used.

Nylon meshes 1 cm square are autoclaved at 15 lb/sq. in. in water, transferred on to malt agar plates, dried, and seeded with a standardised suspension of *Cladosporium resinae* (this being the most important of the organisms which infect aircraft fuel). The plates are incubated for 2 days at 25°C at which stage the nylon meshes are covered with mycebial growth although few or no spores are present.

Six of the above-mentioned fungus-impregnated squares are transferred into 20 ml. of Bushnell-Haas medium (carbon-free mineral salts solution) in a 3-litre conical flask. The Bushnell-Haas medium is then overlaid with 2 litres of jet fuel containing 0.2 g. of 1-Hydroxy-3H-1,2-benzoxaborole (100 ppm) added as a solution in 1 – 2 ml. of EGME. The controls consisted of the same quantities of jet fuel containing 1,500 ppm and 10,000 ppm of EGME and 5,000 ppm of Biobar JF (a commercially available boron-containing biocide) respectively.

Two nylon meshes were withdrawn from the aqueous layer after 1 day, 2 days and 5 days of incubation at room temperature. Each nylon mesh was transferred to a sterile bottle containing 10 ml. of water, shaken vigorously for 5 minutes and then placed on a malt agar plate which was incubated for 5 days at 25°C.

The efficiency of the various compounds is estimated according to the time required to kill the Cladosporium mycelium when the supporting nylon mesh is adjacent to jet fuel containing the test chemical (i.e., when there is no subsequent fungal growth from the nylon mesh on transfer from the Bushnell-Haas medium to the malt agar plate).

The following result were obtained:

| Additive | Concentration in jet fuel (ppm) | Contact time of biocide treated fuel with aqueous layer required for total kill of Cladosporium |
|---|---|---|
| Biobar JF | 5000 | 2 days |
| EGME | 1500 | >5 days |
| EGME | 10000 | >1 day |
| 1-Hydroxy-3H-1,2-benzoxaborole | 100 | 1 day |

EXAMPLE 2

1-Hydroxy-3H-1,2-benzoxaborole was added to portions of molten nutrient agar to provide concentrations of 100 ppm and 500 ppm respectively. Approximately 20 ml. volumes of the treated agar media and a control consisting of agar medium without additive were poured into Petri dishes. After the agar had solidified each sample was streak inoculated with overnight broth cultures of *Escherichia coli* and *Staphylococcus aureus*.

The inoculated Petri dishes were incubated for 24 hours at 37°C, after which they were examined for the presence or absence of bacterial growth.

It was found that the test compound inhibited *Staphylococcus aureus* at 100 ppm and *Escherichia coli* at 500 ppm.

We claim:

1. A method for protecting a hydrocarbon subject to infection by micro-organisms which comprises contacting the hydrocarbon with an effective amount of 1-hydroxy-3H-1,2-benzoxaborole.

2. A method as claimed in claim 1 wherein the hydrocarbon is aircraft fuel containing water.

3. A method as claimed in claim 2 wherein ethylene glycol monomethyl ether is additionally used with the 1-hydroxy-3H-1,2-benzoxaborole in a concentration of 0.15–0.20% by weight based on the weight of the hydrocarbon.

4. A method as claimed in claim 3 wherein the ethylene glycol monomethyl ether is initially added to the aircraft fuel and the 1-hydroxy-3H-1,2-benzoxaborole is thereafter added in intermittent doses to said aircraft fuel containing the ethylene glycol monomethyl ether.

5. A method as claimed in claim 2 wherein the 1-hydroxy-3H-1,2-benzoxaborole is used in an amount of 25 to 1,000 parts per million by weight based on the weight of the fuel.

6. A method as claimed in claim 5 wherein the amount of 1-hydroxy-3H-1,2-benzoxaborole is 100 parts per million by weight.

7. A hydrocarbon contaminated by water and consequently subject to infection by micro-organisms, said composition including from 25 to 1,000 parts per million by weight of 1-hydroxy-3H-1,2-benzoxaborole as protection against infection by said micro-organisms or for the control of such infection when already present.

* * * * *